Oct. 25, 1932.  F. L. HAYES  1,884,673
TANK TRUCK
Filed March 12, 1925   5 Sheets-Sheet 1

Oct. 25, 1932.  F. L. HAYES  1,884,673

TANK TRUCK

Filed March 12, 1925   5 Sheets-Sheet 2

Oct. 25, 1932.  F. L. HAYES  1,884,673
TANK TRUCK
Filed March 12, 1925   5 Sheets-Sheet 3

INVENTOR
Fred L. Hayes
BY
ATTORNEY

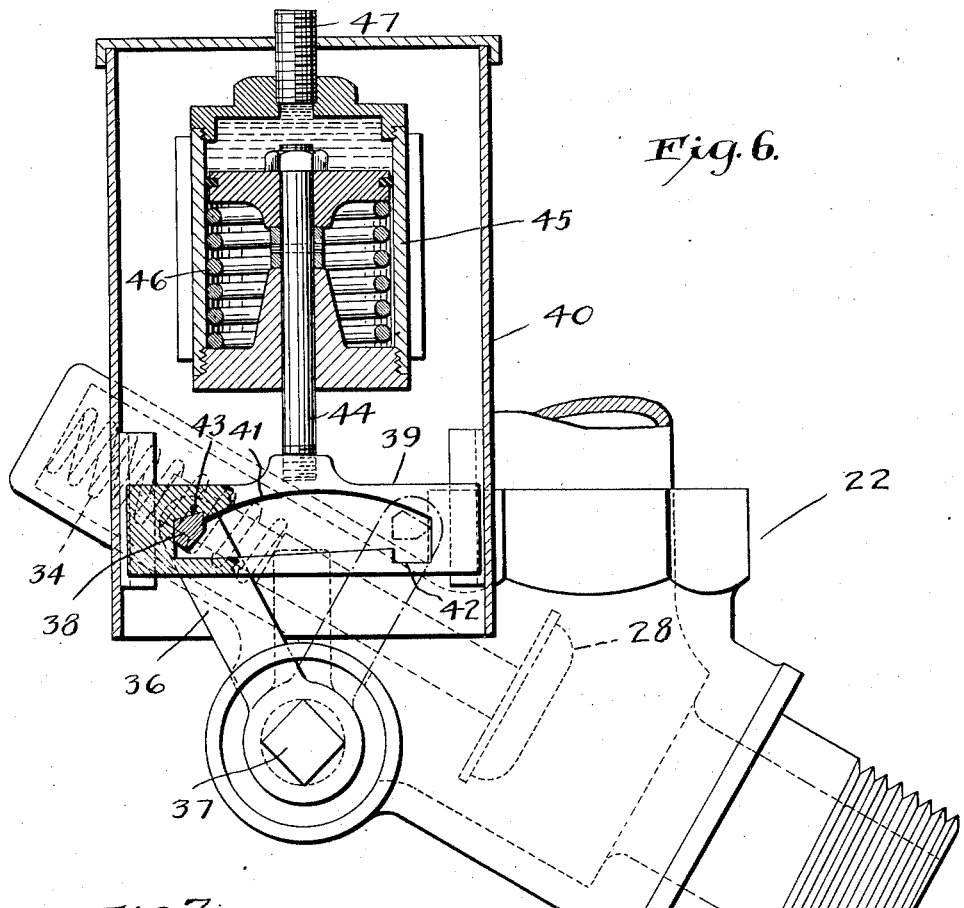
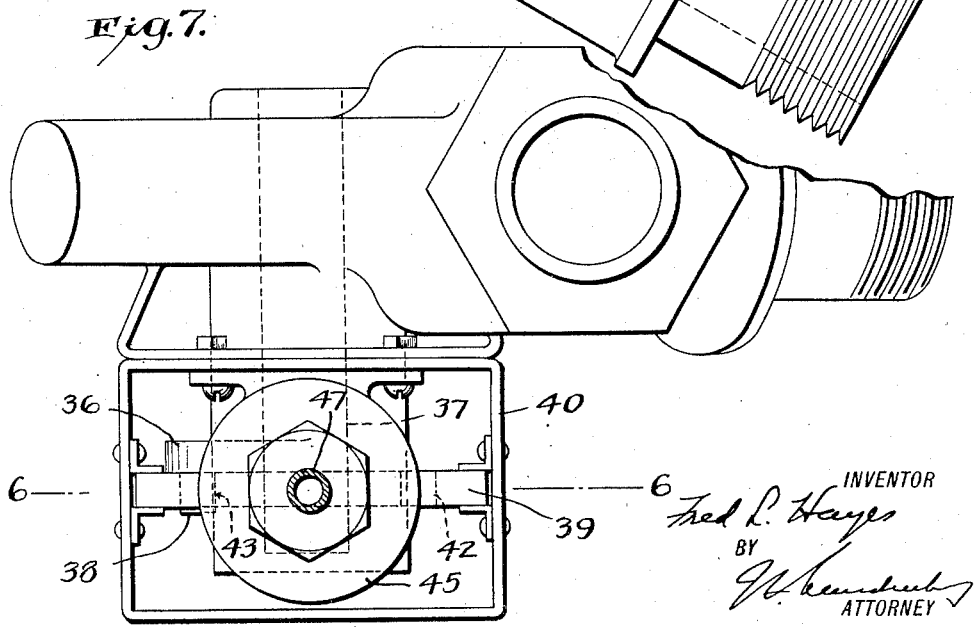

Oct. 25, 1932.  F. L. HAYES  1,884,673
TANK TRUCK
Filed March 12, 1925    5 Sheets-Sheet 5
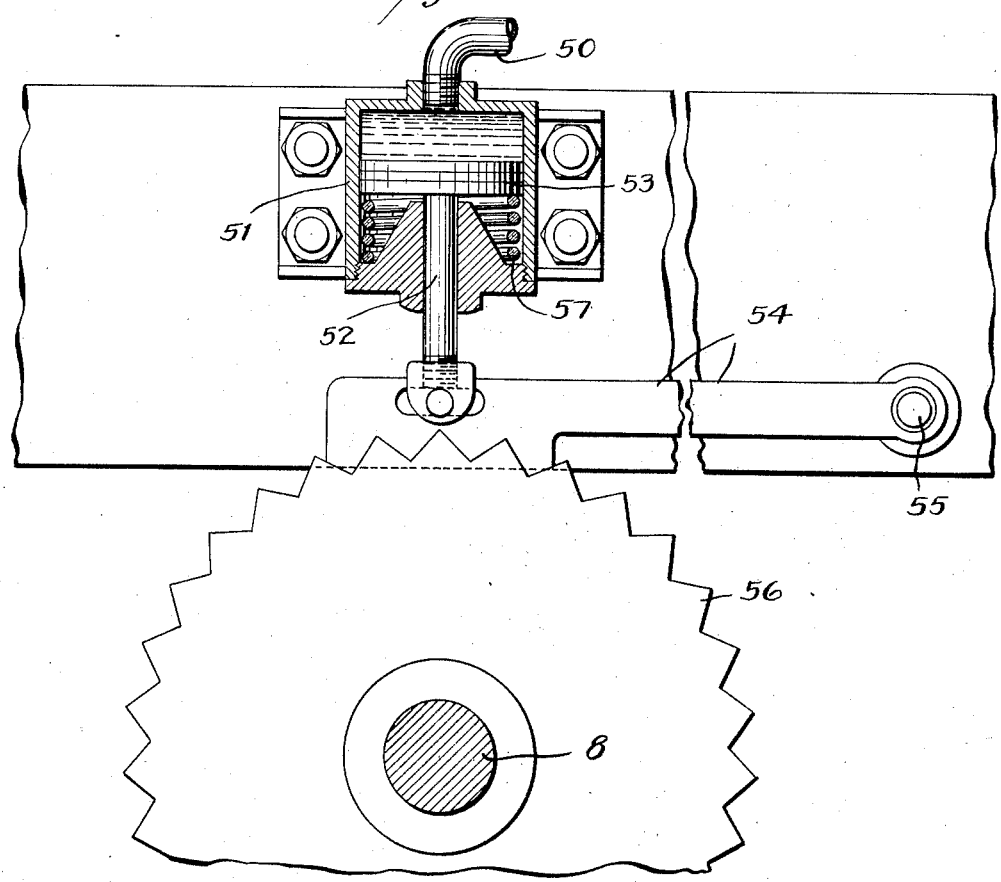
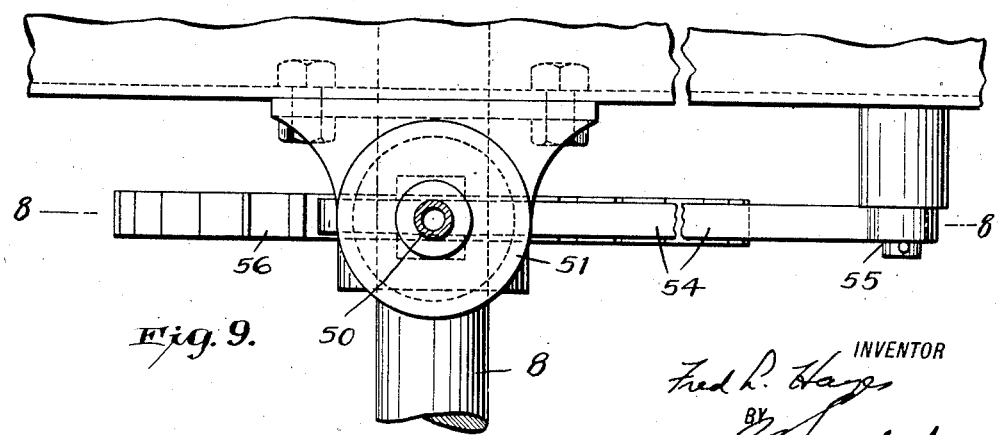
INVENTOR
Fred L. Hayes
BY
ATTORNEY Patented Oct. 25, 1932

1,884,673

UNITED STATES PATENT OFFICE

FRED LAWRENCE HAYES, OF PORT WASHINGTON, NEW YORK, ASSIGNOR, BY MESNE ASSIGNMENTS, TO CHARLES HENRY BICKELL, OF PASSAIC, NEW JERSEY

TANK TRUCK

Application filed March 12, 1925. Serial No. 14,952.

This invention relates to vehicle tanks or tank trucks used for making delivery of inflammable liquids, such as gasoline, and the invention is directed to the provision of a truck tank which can be used with safety for transporting and delivering such liquids in crowded centers of population.

The tank or tank body of this vehicle is divided into a series of compartments which have closed bottoms and siphon mechanism is provided for emptying these compartments, the siphon including a plurality of intake limbs, one in each compartment. Associated with this siphon mechanism is a selective control, so that any desired compartment may be discharged through the siphon. This siphon mechanism includes means, preferably a pump, for initiating siphonic flow, and a by-pass around the pump to permit siphonic flow once initiated to continue without flowing through the pump. The invention also includes the use of a valve normally arresting siphonic flow and necessarily opened by the operator when the contents of the tank are to be discharged.

As another feature, the invention includes a safety interlock between a main discharge valve and a positive lock for the running gear, whereby the discharge of the contents of the tank cannot be accomplished except when the running gear is positively locked. In addition to the features above mentioned, the invention includes others which will be apparent in the detailed description to follow.

In the accompanying drawings, forming part hereof:

Fig. 6 is a sectional elevation, taken on the line 6—6 of Fig. 7, of the main valve and its lock, the full line position of the locking arm corresponding to the open position of the valve and the broken-line position of this arm being the position which it occupies when the valve is closed;

Fig. 7 is a plan view of the parts shown in Fig. 6, with the cover of the lock casing removed;

Fig. 8 is a fragmentary sectional elevation of the lock for the running gear, the plane of the view being indicated by the line 8—8 of Fig. 9; and Fig. 9 is a plan view of these parts.

Figure 1:
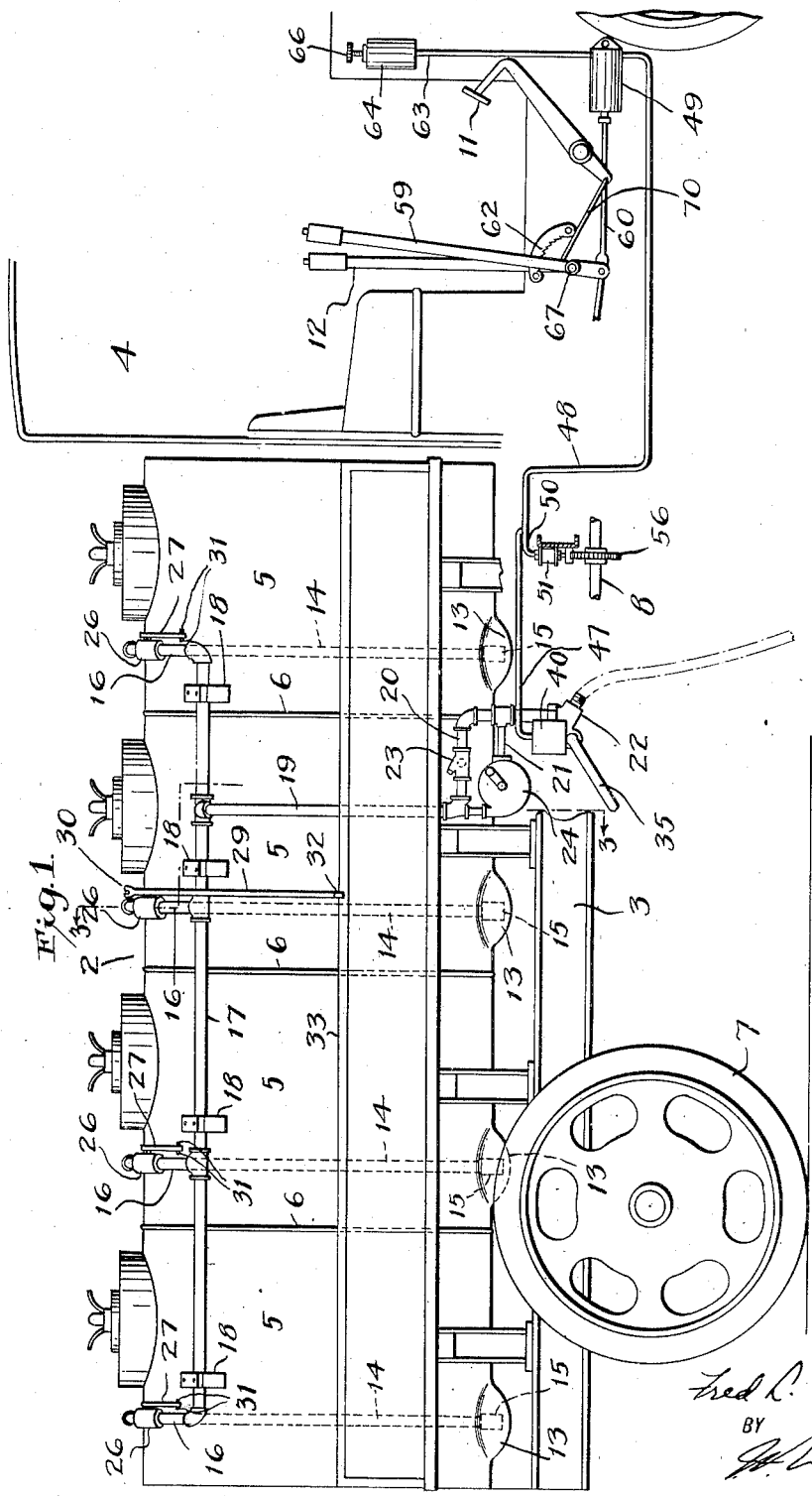
Fig. 1 is an incomplete side elevation of a tank truck machine according to the invention, the machine being at rest and the parts in condition to deliver from one of the tank chambers, the hose being represented by broken lines.

The drawings illustrate a motor-truck machine for making deliveries of gasoline or other liquids. A tank body 2 of ordinary lines is mounted in a customary manner on the frame or chassis 3 behind the driver's cab 4. The tank body is composed of, or divided into, a series of separate tank chambers 5 of given, equal capacity, each chamber holding a unit dump load of, say, fifty gallons suitable for delivery into an underground storage tank. The divisions between the chambers are marked 6, and it will be evident that the chambers may be built as compartments of one tank structure or otherwise.

Figure 2:
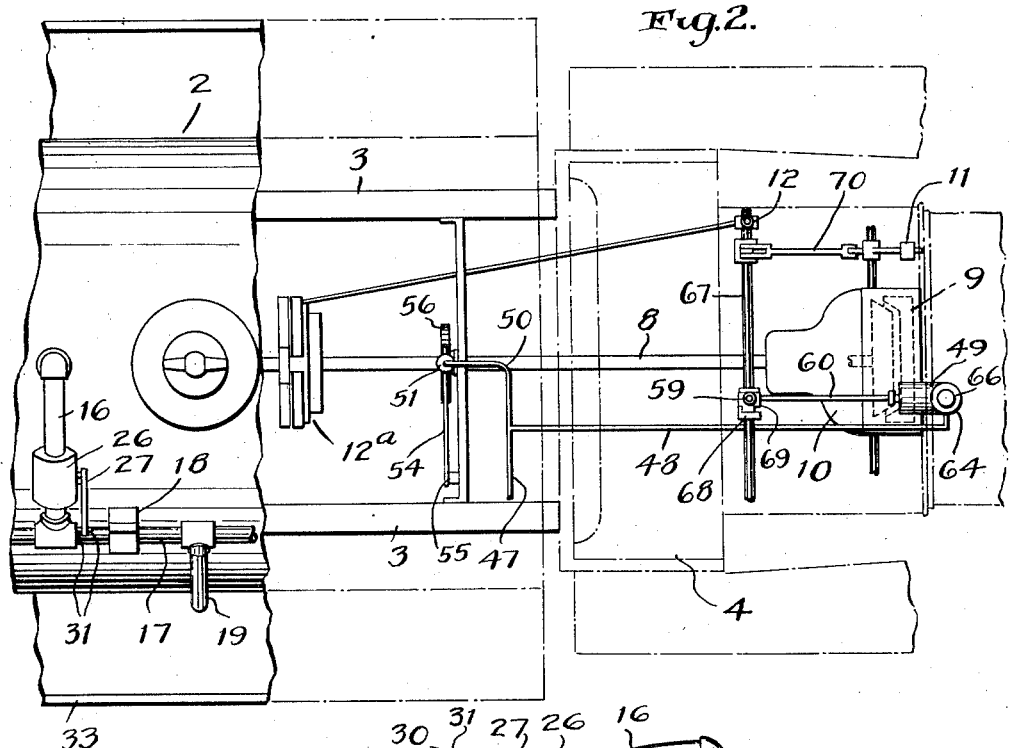
Fig. 2 is a plan view of a forward part of the machine, the forward part of the tank body being broken away to show parts below.
Figure 3:
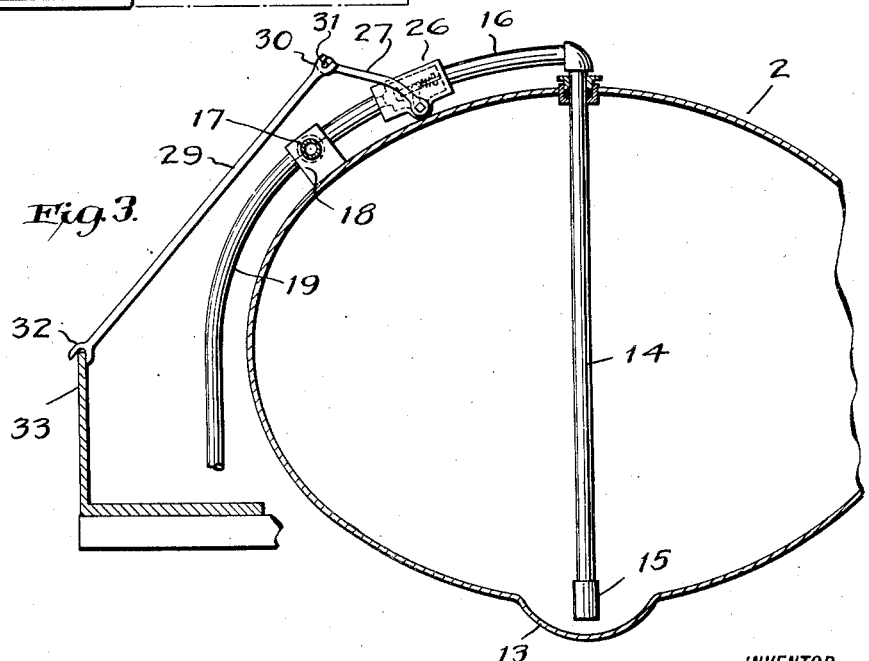
Fig. 3 is a vertical transverse section on the line 3—3 of Fig. 1.
Figure 4:
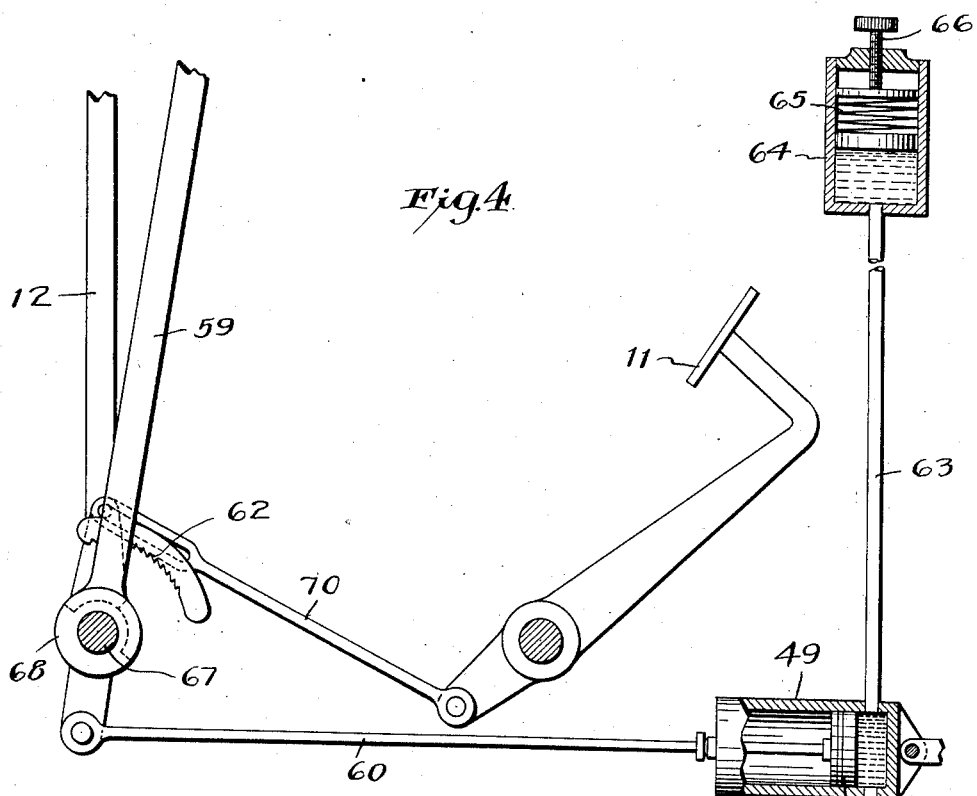
Fig. 4 is a sectional elevation of a part of the operating and interlocking mechanism.
Figure 5:
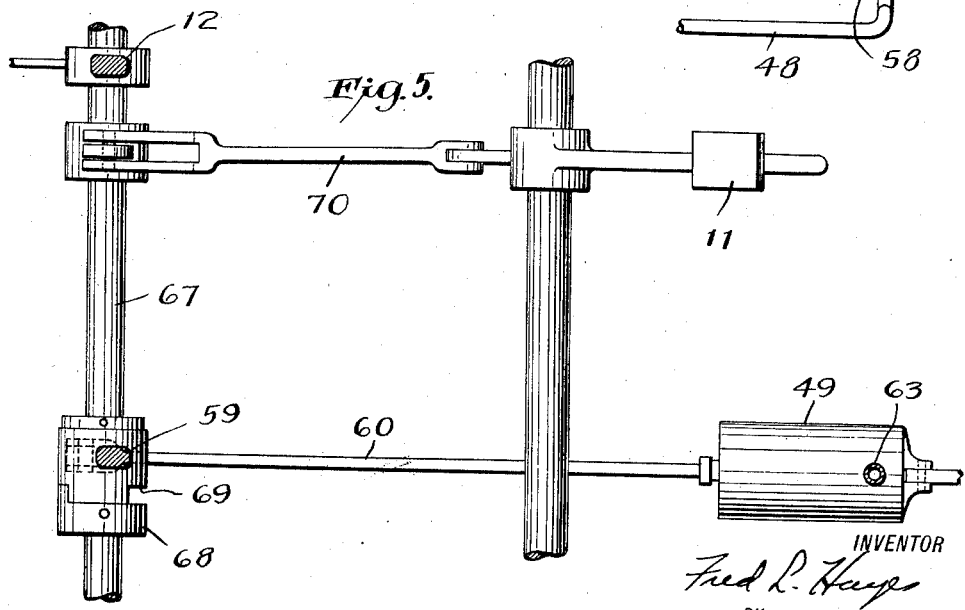
Fig. 5 is a corresponding plan view, with the levers in section.

The power plant of the vehicle is not shown, but will be understood. A portion of the propeller shaft, which extends rearward to drive the rear wheels 7, is indicated at 8. The driver's clutch is located at the region 9, and the change gear transmission at 10. The clutch pedal, depression of which throws out the clutch, is marked 11, and 12 is the usual hand-brake lever. The friction brake 12ª of the vehicle running-gear operated by this lever through a connection 12ᵇ may be on the drive shaft 8, as illustrated in Fig. 2, but the form and location of the brake or brakes is not of consequence.

Each chamber has a depressed pocket 13 in its bottom wall, insuring complete delivery of the unit load irrespective of the grade on which the machine may stand when making a delivery. A pipe 14, forming the inlet leg of a siphon, is mounted in each chamber, passing vertically through the interior of the same and out through the top wall, where it is suitably secured and the joint made tight. The lower, inlet end 15 of each pipe has its opening in the pocket 13.

The upper ends of the several inlet leg pipes 14 have as continuations external branches 16, which, by means of suitable fittings or otherwise, are turned downward for a short distance at one side on the arch of the tank. These branches are all connected to a manifold pipe 17, which extends lengthwise of the upper portion of the tank body, comparatively near the top, where it is supported upon the arch of the tank by bracket blocks 18.

A single downtake pipe 19, of considerable length, is connected to the manifold pipe, toward the front, and, first following the contour of the arch, drops to a low point on the vehicle, where it is divided, by suitable fittings, into two branches or passages 20, 21, which reunite again in a single outlet connection or nozzle 22 positioned below the bottom of the tank.

The passage 20 contains a valve 23, preferably an automatic check-valve, which closes away from and opens toward the outlet 22. The other passage 21 contains a hand pump 24, the function of which is to draw the liquid over the top of the tank and fill the siphon, so that the flow then continues by way of the passage 20 by siphonic action.

The short external branches 16 of the piping of the several tank chambers contain spring-closing valves 26, having levers 27 for opening them. These valves are all normally closed, cutting off the interiors of the chambers from the common outlet 22 and from most of the external piping. When one of the valves is held open and the flow is primed by the pump 24, the contents of that compartment alone is siphoned out into the underground storage tank. It will be understood that the outlet nozzle 22 is then connected with the underground tank by a hose, which the nozzle is formed to receive.

The outlet 22 is also normally closed by a spring-closing valve 28, which shuts off any inflammable vapors in the empty piping from the outside atmosphere and forms a further safeguard against accidental or unintended discharge of liquid. The outlet with its valve is preferably made like the quick-closing faucets which are familiar on ordinary bottom outlet truck tanks.

I find that the overhead position of the manifold 17 is important, since it avoids air-locking, which is likely to occur with a low position of the manifold on such a machine. There is a minimum amount of empty piping between the valves 26 and the manifold, and grades do not interfere with the complete siphoning out of any of the compartments.

The position of the manifold also permits of firm support of the manifold on the tank, which, as the manifold pipe unites all the external piping, contributes greatly to the solidity of the entire system, avoiding looseness and rattling. Leaking or breakage in the piping from such causes would be dangerous and would make the siphon inoperative.

The spring-closing valves 26 are adapted to be opened by the attendant by means of a bar 29, one end 30 of which is forked and the bifurcations of the fork notched to engage the projecting ends of transverse pins 31 set in the ends of the levers 27. The other end of the bar is notched at 32 to engage the upper edge of the cam rail 33, or other support on the side of the vehicle, the bar being of such length that, when the attendant has used it as a handle to push up one of the valve levers 27 to the open position, the bar can then be propped on the can rail to hold the valve open. The prop is secure when the vehicle is at rest, but unstable when it is in motion, so that if the attendant should forget to close the valve after emptying one of the compartments, the jolting will promptly dislodge the bar, causing the valve to close automatically.

In addition to the foregoing, other important safety features are provided, which will now be described.

The outlet valve 28, which controls the outflow from all the tank chambers, is closed by a spring 34 and is opened by a lever 35, which may be either attached or separate, as is common in tank faucets. A swinging locking-arm 36 is connected with the rockable operating spindle 37 of the valve and has a suitable lug 38 on its upper end to cooperate with a slotted locking plate 39. This plate is movable vertically in guides in a protective casing 40, and has at one end of its slot 41 a bottom notch or shoulder 42 adapted to cooperate with the lug 38, when the plate is up, to lock the valve in the closed position, and a top notch or shoulder 43 at the other end of the slot, to lock the valve in the open position, against the action of the strong spring 34 seeking to close it.

The plate 39 is connected to the lower end of the rod 44 of a piston working in a hydraulic cylinder 45, and the piston is adapted to be raised by a spring 46 and to be forced downward by the pressure of oil or other power-transmitting liquid admitted to the cylinder above the piston through a pipe 47. Matters of orientation are, of course, relative, so that, for example, it is not important that the piston be arranged to act vertically.

The casing 40 closely receives and guards the locking plate and arm and the piston rod, preventing tampering, and the casing and the cylinder are preferably mounted on or solidly built with the outlet faucet 22.

The hydraulic power-transmission pipe 47 is branched from a main pipe 48 leading from an operating cylinder 49, which is suitably mounted on the forward part of the vehicle; and another branch 50 from this main leads to a cylinder 51 for locking the running gear of the vehicle.

The rod 52 of the piston 53 of the latter cylinder is connected to a locking lever 54 mounted at one end on a fixed pivot 55 and having at the other end teeth to engage a toothed wheel 56 fixed on the propeller shaft 8, which is connected with the driving wheels of the vehicle. The piston 53, and with it the locking lever 54, are retracted from the locking position by a spring 57, and are actuated to lock the running gear by the pressure of liquid admitted to the cylinder through the pipe 50.

The piston 58 of the cylinder 49 is advanced to force liquid from the cylinder by an attendant's lever 59 in the cab, this lever being connected by a link 60 with said piston 58. The lever is adapted to be locked in the actuated position by a suitable toothed segment 62. The oil chamber of this cylinder is likewise connected by a pipe 63 with a reservoir regulator cylinder 64 containing a piston loaded by a spring 65, the counter-pressure of which is adjustable by a screw 66. The pressure of this spring and of the springs 46 and 57 act upon the liquid in the system toward the cylinder 49 and restore the operating piston 58 to its normal or rearward position when the lever 59 is released from the segment 62.

From the foregoing description it will be perceived that operation of the lever 59 positively locks the running gear of the vehicle, and also moves the locking plate 39 into position to lock the delivery valve 28 in the open position when it is opened by the attendant. Release of the lever unlocks the running-gear and moves the locking plate 39 in the direction to permit the valve 28 to be closed by its spring, whereupon the plate locks the valve closed.

By virtue of the interlock which has been described, the driver is obliged to positively lock the running gear of the vehicle before making a delivery, and it is therefore impossible for the vehicle to accidentally roll away, or be started away, while the delivery is in progress. This eliminates the possibility of gasoline being siphoned out onto the street as the result of such an occurrence.

It is also impossible for the driver to start his vehicle without first closing the main valve; and when the valve is closed it is locked and guarded against being opened mischievously, or intentionally unless the running gear is locked.

As an additional precaution an interlock is likewise provided with the hand brake of the vehicle, and there is also preferably an interlock with the clutch. For this purpose the lever 59 is shown pivoted loosely on the rock-shaft 67 of the hand-brake lever 12, but with one-way-acting clutch collars 68 and 69 on the shaft and on the lever 59 respectively, so that the hand-brake can be applied without moving the locking lever 59, but the locking lever can not be operated without applying the brake. The brake can therefore be used in the ordinary way independently of the locking system, but when a delivery is to be made the hand-brake as well as the running-gear lock must be set. Accidental operation of the running-gear lock while the vehicle is in motion is guarded against, because movement of the lever 59 is obstructed by the hand-brake mechanism. As a further precaution, the shaft 67 is connected with the clutch-pedal by a slotted link 70, so that when the hand-brake is set and before the running-gear lock can be applied the clutch of the motor vehicle is disengaged. This prevents possible damage through faulty operation of the driver who might operate the lock lever while the vehicle wheels were receiving power from the engine, or who might thoughtlessly try to start the vehicle before releasing the positive lock. The slot in the link 70 permits the clutch to be used in the regular way independently of the hand-brake and the running-gear lock.

As a still further precaution, the teeth of the lock-lever 54 and the wheel 56 are made with inclined faces so that while these parts constitute a positive lock preventing any possibility of the vehicle rolling away down a grade, they nevertheless can cam each other out of the way so as to prevent destruction in event, through some failure in the mechanism, of the locking lever becoming engaged with the wheel while the vehicle is being propelled under its power.

While the preferred form of the invention has been described in detail, it will be understood that numerous changes will suggest themselves to the skilled mechanic. For example, hydraulic operating connections such as have been described are very advantageous, but other operating connections might be substituted. The particular form of the mechanical locking arrangements might also be widely varied. In the broad aspect of the safety locking system the valve 28 is representative of any valve for opening and closing a passage for the flow of liquid from the tank of a tank truck.

What I claim as new is:

1. The combination with a tank, of a discharge mechanism comprising a siphon having an intake limb extending to a point near the bottom of said tank and an outlet limb, mechanical means for initiating flow through the siphon said means being connected to the outlet limb of the siphon, a by-pass around said means, said by-pass being formed by a pipe connection independent of said means and connected at its ends to the outlet limb at points spaced from said means, said by-pass permitting free outward siphonic flow from the tank, a self-closing valve normally arresting flow through the siphon, and means for operating the valve to permit such flow.

2. The combination with a tank, of a discharge mechanism comprising a siphon including an intake limb extending to a point within the tank near the bottom thereof and an outlet limb connected to the intake limb and leading to a point below the bottom of said tank, a pump in said outlet limb for initiating flow through said siphon, a self-closing valve in said intake limb normally arresting flow through the siphon, means operable from outside the tank for operating the valve to permit such flow, and a by-pass around the pump, said by-pass being connected at its ends to said outlet limb at points spaced from said pump and permitting free outward siphonic flow from said tank.

3. The combination with a tank comprising a plurality of compartments, of discharge mechanism therefor, comprising a siphon having a plurality of intake limbs, one in each compartment, and a single outlet limb, means for initiating siphonic flow, a self-closing valve normally arresting flow through the outlet limb, and means operable from outside the tank for operating the valve to permit flow therethrough.

4. The combination with a tank comprising a plurality of individual compartments, of discharge mechanism therefor including a siphon having a plurality of intake limbs, one in each compartment, and an outlet limb, means connected to the outlet limb for initiating siphonic flow, and a self-closing valve beyond the said means in the direction of flow from the tank and normally arresting siphonic flow.

5. A tank comprising a plurali y of individual compartments, siphonic means for discharging the compartments, including an intake limb entering each compartment, and a single outlet limb connected to each of said intake limbs, means in said outlet limb for initiating siphonic flow, a self-closing valve in each intake limb for controlling flow therethrough, each valve normally arresting flow and being operable from outside the tank, and a by-pass line connected at its ends to the outlet limb on opposite sides of said means and permitting free siphonic flow outward from the tank to continue around said means upon said flow being initiated by said means.

6. The combination with a tank, of a discharge mechanism comprising a siphon including an intake limb entering the tank and an outlet limb connected to the intake limb and extending to a point below the bottom of the tank, means for initiating siphonic flow, and a spring-actuated valve in the outlet limb and beyond and independent of said initiating means, said valve normally arresting outflow through said limb.

7. The combination with a tank, of a discharge mechanism comprising a siphon including an intake limb entering the tank and an outlet limb extending to a point below the bottom of the tank, a pump connected to the outlet limb for initiating flow, a by-pass around the pump, said by-pass being a pipe line connected at its ends to said outlet limb at points spaced from said pump and permitting free outward flow from said tank and a spring-actuated valve in said outlet limb beyond said pump and by-pass and normally arresting siphonic flow.

8. The combination with a tank having a plurality of compartments of a discharge mechanism therefor, comprising a siphon having a plurality of intake limbs, one in each compartment, and a single outlet limb, a pump connected to said outlet limb for initiating siphonic flow, a by-pass around the pump permitting siphonic flow to continue after initiation, self-closing valves for controlling flow through said intake limbs and individually operable to permit said compartments to be discharged siphonically one at a time, and means for operating said valves from a point remote therefrom.

9. The combination with a tank, comprising a plurality of compartments arranged in a line, of a discharge mechanism therefor comprising a siphon having a plurality of intake limbs, one in each compartment, a single outlet limb connected to said intake limb and extending along said tank, a hand-operated pump connected to said outlet limb and operable to initiate siphonic flow, a by-pass around said pump, self-closing valves normally arresting flow through said intake limbs, and means for operating said valves from outside the tank and at a point remote from the valves.

10. The combination with a tank made up of a plurality of individual compartments disposed in a line, of a discharge mechanism therefor including a siphon having a plurality of intake limbs, one in each compartment, an outlet limb to which said intake limbs are connected, said outlet limb extending along the line of compartments, means connected to said outlet limbs for initiating siphonic flow, a by-pass around said flow initiating means, self-closing valves for controlling flow through said intake limbs, means for operating said valves individually, and a self-closing valve beyond said flow-initiating means in the direction of flow from said tank and normally arresting said flow.

11. The combination with a tank of a discharge mechanism therefor comprising a siphon including an intake limb entering the tank and extending to a point near the bottom thereof and an outlet limb connected to the intake limb and leading to a point below the bottom of said tank, a pump connected to the outlet limb for initiating siphonic flow, a line connected to the outlet limb at points on opposite sides of said pump and constituting a by-pass around said pump, a valve in said by-pass permitting free flow in an outward direction only, and a valve in said siphon normally arresting siphonic flow.

12. The combination with the tank including a plurality of compartments arranged in a line, a discharge mechanism for said tank comprising a siphon having a plurality of intake limbs, one in each compartment, a single outlet limb to which said intake limbs are connected, said outlet limb extending lengthwise along the line of compartments below the top of the tank and including a downwardly extending portion terminating below the bottom of the tank, a pump connected in said portion of the discharge line and operable to initiate siphonic flow, and a line connected to the outlet limb on opposite sides of said pump and constituting a by-pass around said pump for free outward siphonic flow from said tank.

13. The combination with the tank including a plurality of compartments arranged in a line, a discharge mechanism for said tank comprising a siphon having a plurality of intake limbs, one in each compartment, a single outlet limb to which said intake limbs are connected, said outlet limb extending lengthwise along the line of compartments below the top of the tank and including a downwardly extending portion terminating below the bottom of the tank, a pump connected in said portion of the discharge line and operable to initiate siphonic flow, a line connected to the outlet limb on opposite sides of said pump and constituting a by-pass around said pump for free outward siphonic flow from said tank, and a self-closing valve in each intake limb normally arresting siphonic flow.

14. The combination with the tank including a plurality of compartments arranged in a line, a discharge mechanism for said tank comprising a siphon having a plurality of intake limbs, one in each compartment, a single outlet limb to which said intake limbs are connected, said outlet limb extending lengthwise along the line of compartments below the top of the tank and including a downwardly extending portion terminating below the bottom of the tank, a pump connected in said portion of the discharge line and operable to initiate siphonic flow, a line connected to the outlet limb on opposite sides of said pump and constituting a by-pass around said pump for free outward siphonic flow from said tank, and a valve in said outlet limb beyond said pump and by-pass and normally arresting siphonic flow.

FRED LAWRENCE HAYES.